United States Patent
Sakai et al.

(10) Patent No.: US 6,306,519 B1
(45) Date of Patent: Oct. 23, 2001

(54) COATING MATERIAL AND FILM EXTREMELY EXCELLENT IN BARRIER PROPERTIES, AND METHOD FOR PRODUCING THE SAME

(75) Inventors: Hideki Sakai, Miyazaki; Yukiko Katoh, Kanagawa, both of (JP)

(73) Assignee: Asahi Kasei Kaisha, Osaka (JP)

( * ) Notice: Subject to any disclaimer, the term of this patent is extended or adjusted under 35 U.S.C. 154(b) by 0 days.

(21) Appl. No.: 09/174,007

(22) Filed: Oct. 16, 1998

Related U.S. Application Data

(63) Continuation-in-part of application No. PCT/JP96/03472, filed on Nov. 27, 1996.

(30) Foreign Application Priority Data

| Apr. 18, 1996 | (JP) | 8-096706 |
| Jun. 7, 1996 | (JP) | 8-1666616 |
| Jun. 7, 1996 | (JP) | 8-1666617 |
| Jul. 25, 1996 | (JP) | 8-195832 |

(51) Int. Cl.$^7$ ................................................. B32B 27/30
(52) U.S. Cl. ...................... 428/518; 428/520; 427/327.2
(58) Field of Search .................... 428/34.7, 35.4, 428/36.6, 36.7, 411.1, 473.5, 474.4, 476.3, 483, 500, 515, 518, 520; 427/372.2, 384, 393.5; 526/343

(56) References Cited

U.S. PATENT DOCUMENTS

| 4,097,433 | * | 6/1978 | Kane ........................ 260/23 AR |
| 4,324,714 | | 4/1982 | Gibbs et al. |
| 4,451,632 | * | 5/1984 | Gibbs et al. .................. 526/317 |
| 4,535,120 | * | 8/1985 | Hiyoshi et al. ................ 524/560 |

FOREIGN PATENT DOCUMENTS

| 000068461A1 | * | 1/1983 | (EP) . |
| 0435792A2 | | 7/1991 | (EP) . |
| 5757705A | | 4/1982 | (JP) . |
| 357076044A | * | 5/1982 | (JP) . |
| 61115914A | | 6/1986 | (JP) . |
| 6324016B2 | | 5/1988 | (JP) . |
| 354244A | | 3/1991 | (JP) . |
| 4147856A | | 5/1992 | (JP) . |
| 411035763A | * | 2/1999 | (JP) . |

* cited by examiner

Primary Examiner—Paul Thibodeau
Assistant Examiner—D. Lawrence Tarazano
(74) Attorney, Agent, or Firm—Birch, Stewart, Kolasch & Birch, LLP

(57) ABSTRACT

A vinylidene chloride copolymer film or a laminated film far more excellent in barrier properties than the conventional films provided. A vinylidene chloride copolymer film comprising 88% to 93% by weight of vinylidene chloride and 12% to 7% by weight of at least one monomer copolymerizable with vinylidene chloride and having a ratio (Q/P) of 1.5 or more, wherein Q is the integrated intensity of the peak at $2\theta=38°$ and P is the integrated intensity of the peak at $2\theta=15°$, each as determined by the wide angle X-ray reflection method, shows excellent barrier properties. Further, a laminated film comprising a base film and a vinylidene chloride copolymer layer which comprises 88% to 93% by weight of vinylidene chloride and 12% to 7% by weight of at least one monomer copolymerizable with vinylidene chloride and which has a ratio (I/J) of 1.4 or above, wherein I and J are the peak intensity and base line intensity at $2\theta=38°$, respectively, and a half band width of the peak at $2\theta=38°$ of 3° or below, each as determined by the wide angle X-ray reflection method, shows excellent barrier properties.

13 Claims, 4 Drawing Sheets

COATING MATERIAL AND FILM EXTREMELY EXCELLENT IN BARRIER PROPERTIES, AND METHOD FOR PRODUCING THE SAME

This application is a continuation in part of PCT/JP96/03,472, filed Nov. 27, 1996.

TECHNICAL FIELD

The present invention relates to a film or a laminated film of a vinylidene chloride copolymer, which is excellent in barrier properties, and a method for producing the same.

BACKGROUND ART

Coating films of vinylidene chloride copolymers are characterized by excellent barrier properties. Accordingly, films coated with the vinylidene chloride copolymers have been used for making it possible to store food packaged, with oxygen and water vapor cut off, for a long period of time without making the food therein moisturized or oxidized. Of films, some are excellent in barrier properties against oxygen or water vapor. However, films which can cut both oxygen and water vapor off at a high level are rare except for the vinylidene chloride copolymer films. The films coated with the vinylidene chloride copolymers have been widely used mainly as food packaging materials.

Methods for preparing the vinylidene chloride copolymer films are roughly divided into two methods. One is a method of preparing the films by melt extrusion (melt extrusion method), and the other is a method of coating films with aqueous dispersions of the vinylidene chloride copolymers or solutions of the vinylidene chloride copolymers in organic solvents (coating method).

In the case of the melt extrusion method, the polymers are orientated by drawing the vinylidene chloride copolymer films after extrusion, and the films excellent in barrier properties can be prepared. However, when polymers containing 88% or more of vinylidene chloride are intended to be extruded, thermal degradation takes place upon extrusion. Extrusion thereof is therefore practically difficult. In contrast, according to the coating method, even the polymers having a vinylidene chloride content as high as 88% or more can be formed into films, so that films excellent in barrier properties per unit thickness can be obtained. In particular, when solutions of vinylidene chloride copolymers dissolved in organic solvents are applied, coating films very thin in thickness and excellent in barrier properties are obtained because the solutions little contain additives impeding the barrier properties such as plasticizers and surfactants. As the method for preparing a coating film excellent in barrier properties by applying a solution of a vinylidene chloride copolymer dissolved in an organic solvent, for example, JP-B-63-24016 (the term "JP-B" as used herein means an "examined Japanese patent publication") and JP-A-3-54244 (the term "JP-A" as used herein means an "unexamined published Japanese patent application") disclose methods for preparing films excellent in barrier properties by dissolving vinylidene chloride polymers in specific organic solvents.

However, with recent high-level requirements for barrier properties in the market, films more excellent in barrier properties than the conventional films have now been demanded.

It is an object of the present invention to provide a film or a laminated film of a vinylidene chloride polymer more excellent in barrier properties than the conventional ones.

DISCLOSURE OF INVENTION

As a result of extensive investigation for solving the above-mentioned problems, the present inventors have obtained a surprising finding as described below. That is to say, the present inventors have discovered that application of a coating material obtained by dissolving a vinylidene chloride copolymer in an organic solvent, then cooling the resulting solution to nearly a temperature at which the solution is gelated, and allowing it to stand can provide a vinylidene chloride copolymer film or laminated film having a unique structure, in which although the density is scarcely different, the degree of orientation is high as compared with the films obtained by the prior art, and being excellent in barrier properties, thus completing the present invention.

That is, the present invention relates to a vinylidene chloride copolymer film having excellent barrier properties, which comprises 88% to 93% by weight of vinylidene chloride and 12% to 7% by weight of at least one monomer copolymerizable with vinylidene chloride and which has a ratio (Q/P) of 1.5 or more, wherein Q is the integrated intensity of the peak at $2\theta=38°$ and P is the integrated intensity of the peak at $2\theta=15°$, each as determined by the wide angle X-ray reflection method.

Further, the present invention also relates to a laminated film having excellent barrier properties, comprising a base film and a vinylidene chloride copolymer layer which comprises 88% to 93% by weight of vinylidene chloride and 12% to 7% by weight of at least one monomer copolymerizable with vinylidene chloride and which has a ratio (I/J) of 1.4 or above, wherein I and J are the peak intensity and base line intensity at $2\theta=38°$, respectively, and a half band width of the peak at $2\theta=38°$ of 3° or below, each as determined by the wide angle X-ray reflection method while the incident X-ray is introduced from the vinylidene chloride copolymer layer side.

The base film for use herein is at least one polymer selected from polyesters, polyamides, polyimides, polypropylene, polyethylene, polyvinyl alcohol, cellophane, polystyrene, polyvinyl chloride, ethylene-vinyl alcohol copolymers and polycarbonates.

Here, the diffraction angle $2\theta=15°$ corresponds to a (100) plane in terms of crystal structure, and $2\theta=38°$ corresponds to a (020) plane in terms of crystal structure. In the films or laminated films obtained by the conventional coating methods, polymers are little orientated, so that a peak is scarcely observed at $2\theta=38°$ according to the wide angle X-ray reflection method. However, interestingly, in the vinylidene chloride copolymer films or laminated films of the present invention, a (020) plane is orientated in parallel with a film surface, so that a great peak is observed at $2\theta=38°$. In the case of vinylidene chloride copolymer films, therefore, the orientation can be specified by the ratio of the intensity of a peak at $2\theta=38°$ on the basis of the base line intensity at $2\theta=15°$, of the diffraction peaks obtained by the wide angle X-ray reflection method. In the case of laminated films, the orientation can be specified by the ratio of the intensity of a peak at $2\theta=38°$ on the basis of the base line intensity obtained by the wide angle X-ray reflection method while the incident X-ray is introduced from the vinylidene chloride copolymer layer side.

In the vinylidene chloride copolymer film of the present invention, it is necessary that the ratio (Q/P) be 1.5 or more, wherein Q is the integrated intensity of the peak at $2\theta=38°$ and P is the integrated intensity of the peak at $2\theta=15°$, each as determined by the wide angle X-ray reflection method. The ratio (Q/P) is preferably 2 or more. When the integrated intensity ratio is less than 1.5, sufficient barrier properties are not exhibited because of low degree of orientation.

Further, in the laminated films of the present invention, it is necessary that the ratio (I/J) be 1.4 or above, wherein I and J are the peak intensity and base line intensity at 2θ=38°, respectively, and that the half band width of the peak at 2θ=38° be 3° or below, each as determined by the wide angle X-ray reflection method while the incident X-ray is introduced from the vinylidene chloride copolymer layer side. The intensity ratio (I/J) is preferably 1.8 or above. When the intensity ratio is less than 1.4, sufficient barrier properties are not exhibited because of low degree of orientation.

Methods for producing the vinylidene chloride copolymer film or laminated film of the present invention include the following methods:

(1) A method of: applying a coating material prepared by putting, into an organic solvent, powder of a vinylidene chloride copolymer obtained by emulsion polymerization of 88% to 93% by weight of vinylidene chloride with 12% to 7% by weight of at least one copolymerizable monomer, dissolving it to prepare a solution, and allowing the solution to stand at a temperature of a gelation temperature +20° C. or less for one hour or more; and subjecting the applied coating material to heat treatment at from 30° C. to 80° C.; and (2) A method of: applying a coating material prepared by putting, into an organic solvent, powder of a vinylidene chloride copolymer obtained by emulsion polymerization of 88% to 93% by weight of vinylidene chloride with 12% to 7% by weight of at least one copolymerizable monomer, dissolving it to prepare a solution, adding a poor solvent thereto and allowing the solution to stand at a temperature of a gelation temperature +20° C. or less for one hour or more; and subjecting the applied coating material to heat treatment at from 30° C. to 80° C.

The term "gelation temperature" used herein means the highest temperature of the temperature range in which, if a solution of a vinylidene chloride copolymer in an organic solvent is allowed to stand for one hour or more, the solution reaches a state showing no fluidity at all.

The organic solvent for use in the present invention is a good solvent alone or a mixture of a good solvent and a poor solvent. The good solvent includes tetrahydrofuran and methyl ethyl ketone, and tetrahydrofuran is particularly preferred. The poor solvent includes aromatic hydrocarbons such as toluene and xylene and esters such as butyl acetate, and toluene is particularly preferred.

If the ratio of the poor solvent contained in the organic solvent exceeds 50% of the total of all solvents, the transparency of a coating film is impaired. Accordingly, the ratio of the poor solvent is preferably within the range of from 20% to 50%, and more preferably within the range of from 30% to 45%.

When the solution in which a vinylidene chloride copolymer has been dissolved in an organic solvent according to the method of the present invention is allowed to stand at a temperature of a gelation temperature +20° C. or less, the phenomenon of deteriorating the transparency of the solution is observed. The reason for this is presumed to be that a polymer having a relatively high crystallinity which has been dissolved in the solution is precipitated in the solution because the temperature thereof is decreased lower than the dissolving temperature. It is presumed that application of the solution in which such a polymer having high crystallinity is precipitated forms a coating film having superior barrier properties as compared to application of a solution in which such a polymer is not precipitated. Accordingly, the coating material of the present invention has an excellent characteristic of forming a vinylidene chloride copolymer film or laminated film having excellent barrier properties.

For obtaining the vinylidene chloride copolymer film or laminated film having more excellent barrier properties, it is preferred that the ratio of the poor solvent in the organic solvents of the coating materials is elevated. However, when the ratio of the poor solvents is elevated, it is necessary that the dissolution of the powder of the vinylidene chloride copolymers be carried out at a higher temperature in order to completely dissolve it. Dissolution at higher temperatures unfavorably causes coloring of the solutions and a problem of the working environment due to evaporation of solvent vapor. Then, it is preferred that the powder of the vinylidene chloride copolymers is completely dissolved at a low temperature, and further that the solution having a high poor solvent ratio is prepared.

Therefore, according to a preferred method for use in the present invention, the powder of the vinylidene chloride copolymers is completely dissolved in a good solvent alone or organic solvents having a low poor solvent ratio, and then, the poor solvent is added thereto, thereby being able to prepare the solution having a high poor solvent ratio with a low dissolving temperature.

In the vinylidene chloride copolymer for use in the present invention, when the ratio of vinylidene chloride exceeds 93% by weight, the solubility thereof in a solvent becomes poor, unfavorably resulting in failure of complete dissolution under usual dissolving conditions. On the other hand, less than 88% by weight unfavorably results in poor barrier properties and reduction in the effects of the present invention. Accordingly, the vinylidene chloride content of the copolymers is required to be within the range of 88% to 93% by weight, and more preferably within the range of 89% to 92% by weight.

Specific examples of the monomers copolymerizable with vinylidene chloride include vinyl chloride, acrylic esters such as methyl acrylate, ethyl acrylate, butyl acrylate, 2-ethylhexyl acrylate and 2-hydroxyethyl acrylate, methacrylic esters such as methyl methacrylate and glycidyl methacrylate, acrylonitrile, methacrylonitrile, and unsaturated carboxylic acids such as acrylic acid, methacrylic acid, itaconic acid and maleic acid. One or two or more kinds of them can be selectively used.

When the solutions are allowed to stand at a temperature exceeding a gelation temperature +20° C., the effect of improving the barrier properties is reduced. Further, when the period for allowing the solution to stand for is less than one hour, the effect of improving the barrier properties is reduced. It is therefore necessary that the solution be allowed to stand at a gelation temperature +20° C. or less for one hour or more. A temperature of lower than 0° C. causes condensation of moisture contained in the air to contaminate the solutions therewith, so that it is not preferred so much. Accordingly, the solution is allowed to stand preferably at a temperature ranging from 0° C. to a gelation temperature +20° C. for one hour or more, and more preferably at a temperature ranging from 0° C. to a gelation temperature +10° C. for one hour or more.

The solution has a too high viscosity at a coating temperature not higher than a gelation temperature, which causes problems upon coating. Then, in case where the solution is allowed to stand at a temperature not higher than a gelation temperature, it becomes necessary to heat the solution before coating to reduce the viscosity thereof. In this case, it is preferred that the solution is applied within one hour after heating at a gelation temperature +30° C. or less.

Furthermore, the crystallinity of the coating film is low immediately after coating, so that it is necessary to accelerate crystallization by heat treatment. The heat treatment temperature in this case is preferably within the range of from 30° C. to 80° C., and more preferably within the range of from 35° C. to 70° C. The heat treatment is preferably carried out until crystallization sufficiently proceeds. When crystallization of the vinylidene chloride copolymers proceeds, the ratio of the absorbance of a peak at 1046 cm$^{-1}$ on the basis of that at 1070 cm$^{-1}$ increases, as measured with an infrared spectrophotometer. Then, the heat treatment time is preferably a period of time taken until the absorbance ratio becomes to exhibit no substantial increase. Rough measures of the heat treatment time are about 24 hours in case of the heat treatment temperature being 40° C., and about 4 hours in case of 60° C. and about 2 hours in case of 80° C.

When methacrylonitrile is selected so as to be contained in an amount of 50% or more as the monomer copolymerizable with vinylidene chloride, application of the resulting copolymer according to the above-mentioned producing method of the present invention provides the vinylidene chloride copolymer film or laminated film having extremely excellent barrier properties. This vinylidene chloride copolymer film or laminated film extremely excellent in barrier properties is characterized by that the peak temperature of βa as determined by the thermally stimulated current method (TSC) is 70° C. or more.

The thermally stimulated current method is a method in which polarization is developed in a sample, and thereafter, the sample is rapidly cooled to freeze the polarization, followed by elevation of the temperature to measure current flowing in depolarizing the frozen polarization. Accordingly, a higher depolarizing temperature results in a state in which molecules are more difficult to move.

When the vinylidene chloride copolymer film or laminated film obtained by application of the vinylidene chloride copolymer is measured by the thermally stimulated current method (TSC), two peaks are observed between about 0° C. and about 100° C., and the peak on the higher temperature side is βa dispersion. It can be, therefore, considered that a higher peak temperature (particularly, with respect to a βa peak temperature in a high temperature portion) shows lower molecular movability and more excellent barrier properties. The vinylidene chloride copolymer films or laminated films obtained by application of a vinylidene chloride copolymer according to the prior art techniques have a βa peak temperature of 60° C. or less. In contrast, the vinylidene chloride copolymer film or laminated film obtained by the producing method of the present invention has a βa peak temperature of 70° C. or more, and is very low in molecular movability and extremely excellent in barrier properties.

In the present invention, preferred examples of methods for producing the vinylidene chloride copolymer powder include a method of adding an aqueous dispersion obtained by emulsion polymerization to an aqueous solution of a coagulating agent to coagulate it, followed by washing and drying to prepare the vinylidene chloride copolymer powder. In this case, it is necessary to adjust the temperature to a temperature at which polymer particles are coagulated upon addition of the aqueous dispersion to the aqueous solution of the coagulating agent. Specific examples of the coagulating agent used in this method include acids such as hydrochloric acid, sulfuric acid, nitric acid, acetic acid and phosphoric acid, alkali metal salts such as sodium chloride, alkaline earth metal salts such as calcium chloride and magnesium sulfate, and aluminum salts such as aluminum sulfate. They can be used alone or as a mixture thereof. Although there is no particular limitation on the amount thereof added, they are usually added in an amount of about 0.05% to about 10% by weight based on the copolymer. It is preferred that the amount added is as small as possible, because the amount of the agent contained in the powder can be reduced.

Other examples of the methods for coagulating the aqueous dispersion of the vinylidene chloride copolymer include the following methods:

(1) A method of adding dropwise the aqueous dispersion of the vinylidene chloride copolymer to a poor solvent such as methanol and toluene, or spraying it into the solvent, thereby coagulating it; and (2) A method of agitating the aqueous dispersion of the vinylidene chloride copolymer at high speed, thereby coagulating it.

BRIEF DESCRIPTION OF DRAWINGS

In FIGS. 2 and 3, the symbol I represents the intensity of the peak at 2θ=38° as determined by the wide angle X-ray reflection method, and the symbol J represents the intensity of the base line at 2θ=38° as determined by the wide angle X-ray reflection method.

BEST MODE OF FOR CARRYING OUT THE INVENTION

Figure 1:
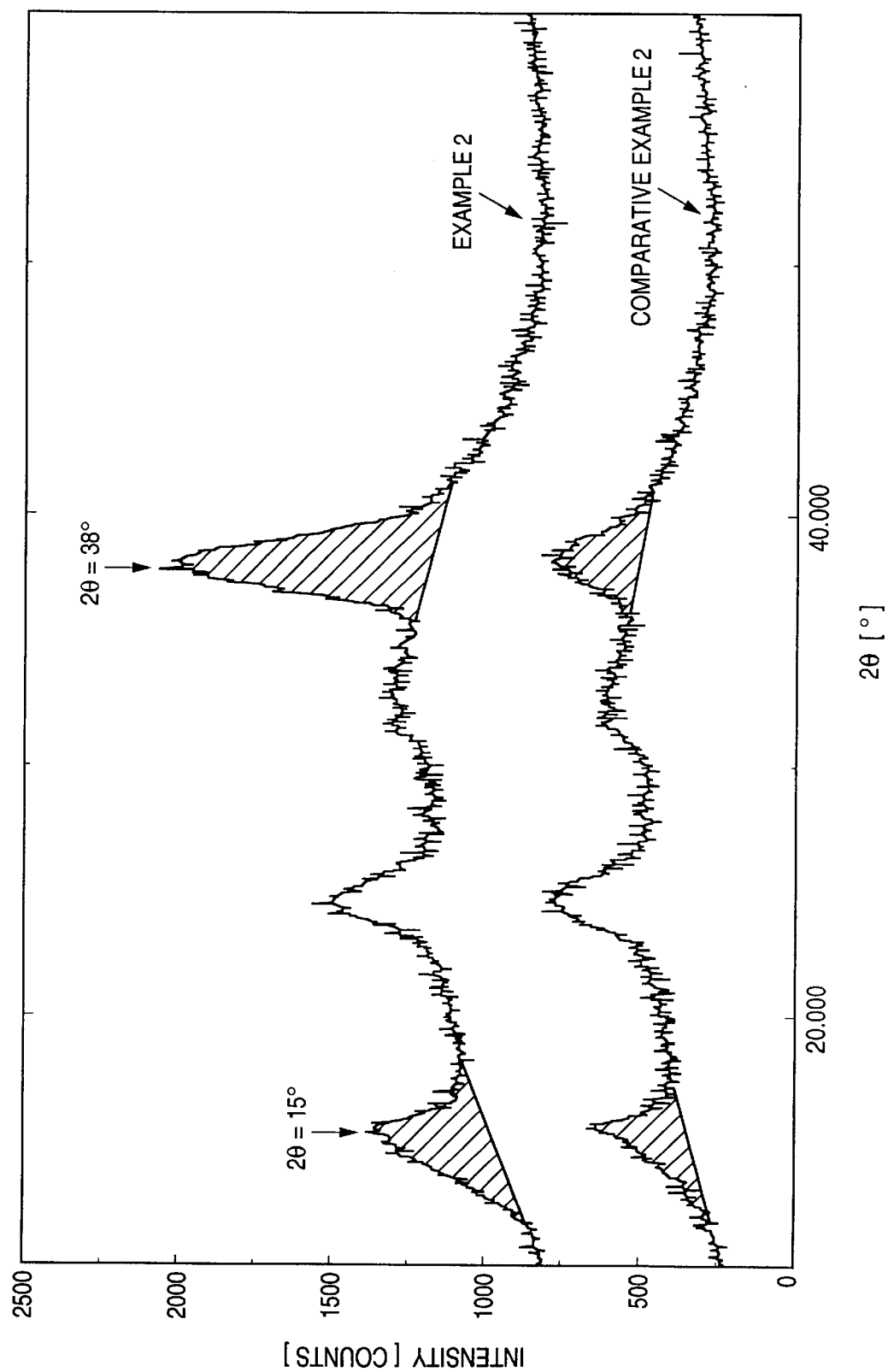
FIG. 1 shows a diffraction diagram determined by the wide angle X-ray reflection method of a vinylidene chloride copolymer film of Example 2 in this invention in which a solution has been allowed to stand at 50° C. for 4 hours after dissolution, and that of a vinylidene chloride copolymer film of Comparative Example 2.

The present invention will be further illustrated in greater detail with reference to the following examples, but should not to be construed as being limited thereby. In the examples, parts and percentages are expressed in parts by weight and percentages by weight, respectively.

The properties were evaluated by the following methods:

(1) Wide Angle X-ray Reflection Method

Using an X-ray diffractometer (manufactured by Rigaku Corporation), a diffraction profile was taken by the reflection method. In the case of the vinylidene chloride copolymer film, the ratio of the area of a diffraction peak at 2θ=38° to the area of a diffraction peak at 2θ=15° was determined by the gravimetric method. In the case of the laminated film, an X-ray was incident on the vinylidene chloride copolymer layer to make measurement, and the intensity ratio (I/J) was determined, taking the intensity of a diffraction peak at 2θ=38° as I and the intensity of a base line as J. In this case, the base line was taken as a line connecting 2θ=36° and 40°. Further, the half band width was represented by the width of half the intensity of a diffraction peak at 2θ=38° in terms of angle.

(2) Thermally Stimulated Current Method

Using a TSC/RMA spectrometer (manufactured by Solomat Co.), a sample film was put between electrodes, polarized at 100° C. at a field intensity of 10 kV/mm for 2 minutes, cooled to −150° C., then short-circuited, and thereafter measured at a programming rate of 7° C./minute.

(3) Density

The density was measured at 20° C. by the density-gradient tube method using zinc chloride.

(4) Oxygen Permeability

Using an OXTRAN-100 (manufactured by Modern Control Co.), the oxygen permeability was measured, based on JIS K 7126, method B (equal pressure method) under the conditions of 20° C. and 70% RH, and the measurements were converted to 2.5 g/m$^2$.

EXAMPLE 1

A glass-lined pressure reaction vessel was charged with 100 parts of ion-exchanged water, 0.1 part of sodium alkylsulfonate and 0.9 part of sodium persulfate, and degassed, followed by keeping the temperature of contents at 50° C. In another vessel, 90% by weight of vinylidene chloride and 10% by weight of acrylonitrile were weighed out and mixed with each other to prepare a monomer mixture. To the above-mentioned reaction vessel, 0.6 part of acrylonitrile and 0.8 part of itaconic acid were added, and then, the whole of the above-mentioned monomer mixture (100 parts) was continuously added thereto over 16 hours. At this time, 0.1 part of sodium hydrogensulfite was also continuously added together with the monomer mixture. After addition of the whole of the monomer mixture, the inner pressure immediately started to fall, and the reaction was allowed to proceed until a fall in the inner pressure disappeared, thereby obtaining an aqueous dispersion of a vinylidene chloride polymer. To 100 g of a 3% aqueous solution of calcium chloride heated at 60° C., 30 g of this aqueous dispersion of the vinylidene chloride polymer was added dropwise little by little with stirring. Then, the formed aggregates were washed with water and dried to obtain a white powder. Ten grams of the vinylidene chloride polymer powder thus obtained was added to a mixed solvent of 36 g of methyl ethyl ketone and 18 g of toluene, and then, the temperature was elevated to 70° C. to dissolve the polymer completely. This solution was cooled to 40° C., and allowed to stand for one hour or for 4 hours. Thereafter, releasing paper was coated with the solution, dried in an oven kept at 120° C. for 30 seconds, and then, heat treated in an oven kept at 40° C. for one day to prepare a desired vinylidene chloride copolymer film. A biaxial oriented polypropylene film (having a thickness of 18 μm) was coated with the solution in a similar manner so as to give a dry amount coated of 2.5 g/m$^2$, and heat treated to obtain a desired laminated film. This solution had a gelation temperature of 30° C.

EXAMPLE 2

The vinylidene chloride copolymer solution as prepared in Example 1 was allowed to stand at 50° C. for one hour or for 4 hours. Then, a vinylidene chloride copolymer film and a laminated film were prepared in the same manner as in Example 1. A diffraction diagram of this vinylidene chloride copolymer film according to the wide angle X-ray reflection method is shown in FIG. 1.

EXAMPLE 3

Figure 2:
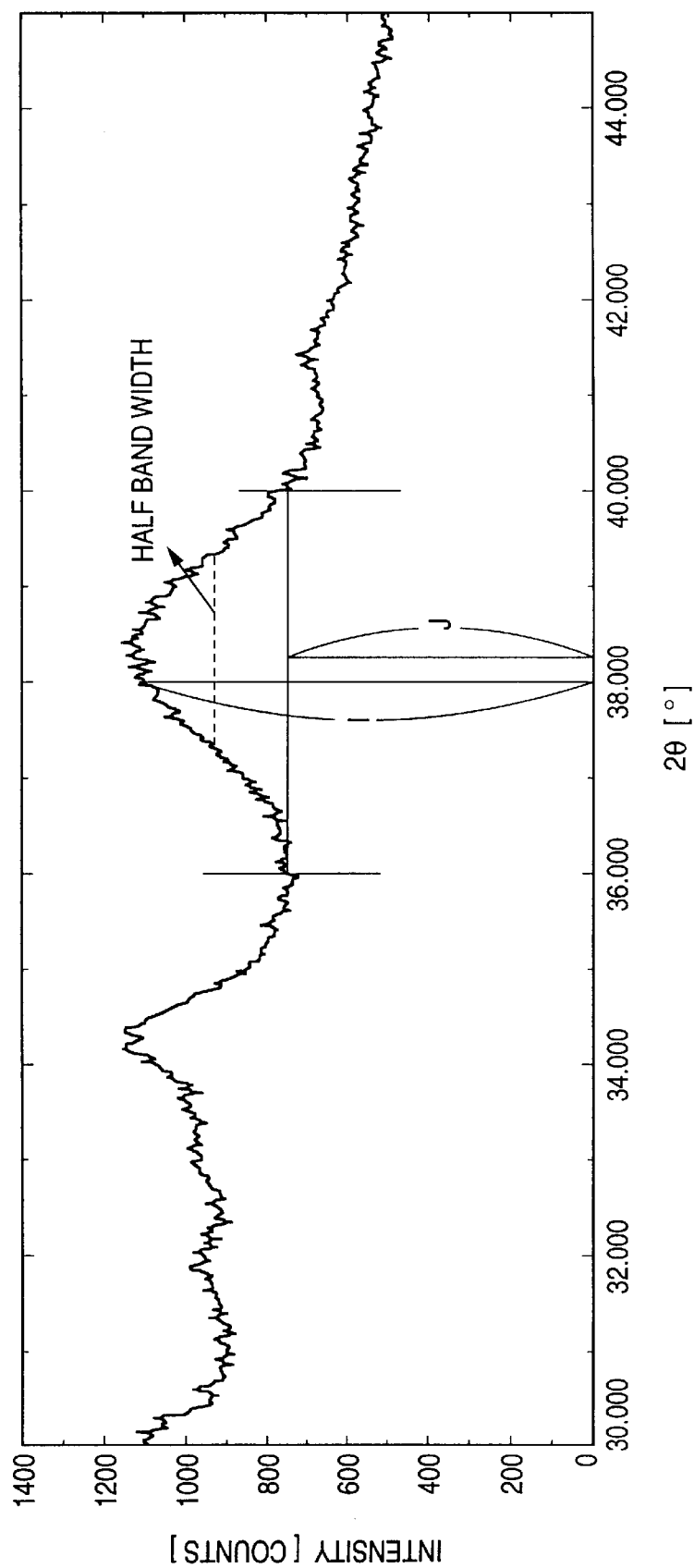
FIG. 2 shows a diffraction diagram determined by the wide angle X-ray reflection method of a laminated film of Example 3 in this invention.

The vinylidene chloride copolymer solution as prepared in Example 1 was allowed to stand at 20° C. for 3 hours. As a result, the solution gelled. Then, the gel was heated at 50° C. for 30 minutes to a solution state. Thereafter, a vinylidene chloride copolymer film and a laminated film were prepared in the same manner as in Example 1. A diffraction diagram of this laminated film according to the wide angle X-ray reflection method is shown in FIG. 2.

Comparative Example 1

Figure 3:
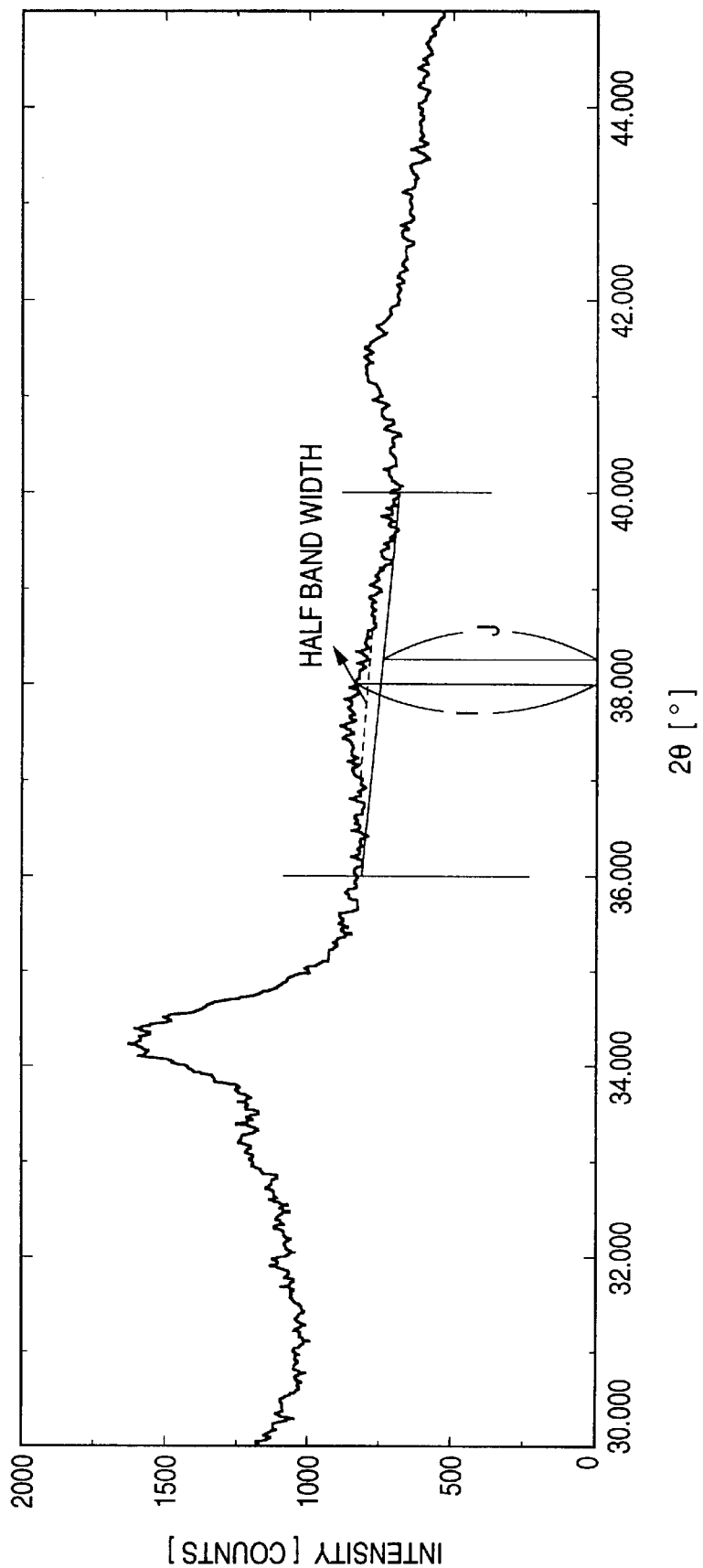
FIG. 3 shows a diffraction diagram determined by the wide angle X-ray reflection method of a laminated film of Comparative Example 1 in this invention.

The vinylidene chloride copolymer solution as prepared and dissolved at 70° C. in Example 1 was allowed to stand at the temperature for one hour or for 4 hours. Thereafter, a vinylidene chloride copolymer film and a laminated film were prepared in the same manner as in Example 1. A diffraction diagram of this laminated film according to the wide angle X-ray reflection method is shown in FIG. 3.

Comparative Example 2

The vinylidene chloride copolymer solution as prepared in Example 1 was allowed to stand at 50° C. for 30 minutes. Thereafter, a vinylidene chloride copolymer film and a laminated film were prepared in the same manner as in Example 1. A diffraction diagram of this vinylidene chloride copolymer film according to the wide angle X-ray reflection method is shown in FIG. 1.

EXAMPLE 4

Twelve grams of the vinylidene chloride copolymer as prepared in Example 1 was added to a mixed solvent of 12 g of tetrahydrofuran, 36 g of methyl ethyl ketone and 12 g of toluene, and then, the temperature was elevated to 50° C. to dissolve the copolymer completely. The resulting solution was allowed to stand at 30° C. for one hour or for 4 hours. Then, a vinylidene chloride copolymer film and a laminated film were prepared in the same manner as in Example 1. This solution had a gelation temperature of 20° C.

EXAMPLE 5

The vinylidene chloride copolymer solution as prepared in Example 4 was allowed to stand at 10° C. for 3 hours. As a result, the solution gelled. Then, the gel was heated at 45° C. for 30 minutes to a solution state. Thereafter, a vinylidene chloride copolymer film and a laminated film were prepared in the same manner as in Example 1.

Comparative Example 3

The vinylidene chloride copolymer solution as prepared in Example 4 was allowed to stand at 50° C. for one hour or for 4 hours. Then, a vinylidene chloride copolymer film and a laminated film were prepared in the same manner as in Example 1.

Comparative Example 4

The vinylidene chloride copolymer solution as prepared in Example 4 was allowed to stand at 30° C. for 30 minutes. Then, a vinylidene chloride copolymer film and a laminated film were prepared in the same manner as in Example 1.

EXAMPLE 6

Figure 4:
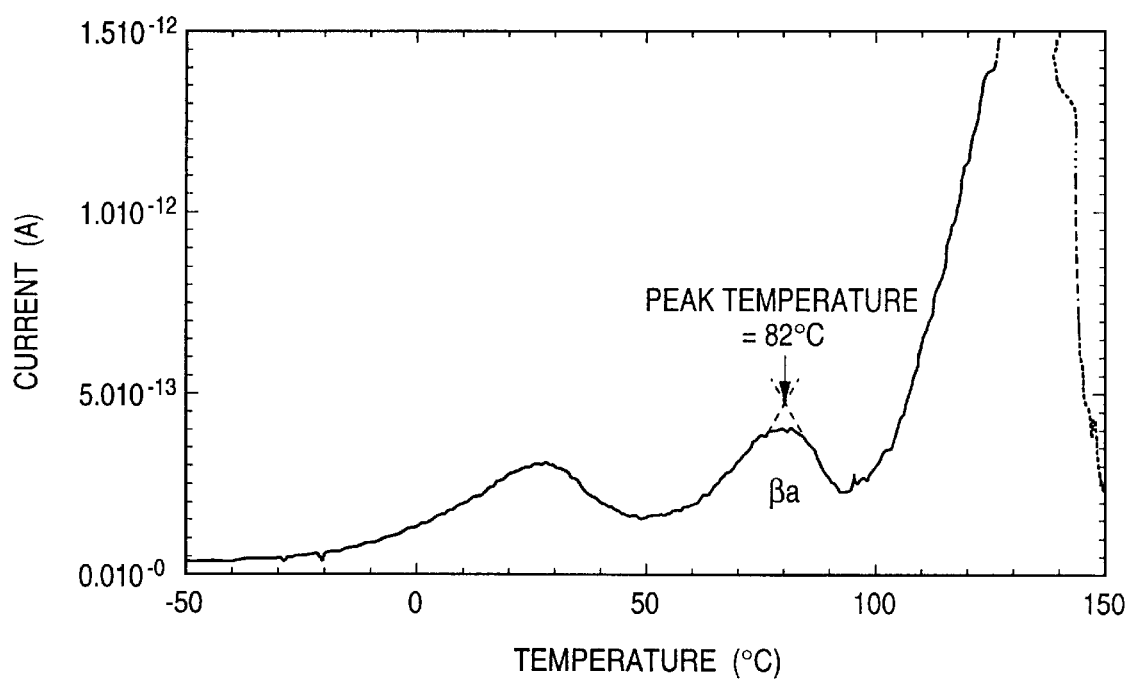
FIG. 4 is a graph showing results of measurement of thermally stimulated current for a laminated film of Example 6 in this invention in which a solution has been allowed to stand at 35° C. for 1 hour after dissolution.

A glass-lined pressure reaction vessel was charged with 100 parts of ion-exchanged water, 0.1 part of sodium alkylsulfonate and 0.9 part of sodium persulfate, and degassed, followed by keeping the temperature of contents at 50° C. In another vessel, 90% by weight of vinylidene chloride, 5% by weight of methacrylonitrile and 5% by weight of methyl methacrylate were weighed out and mixed with each other to prepare a monomer mixture. To the above-mentioned reaction vessel, 0.6 part of methacrylonitrile and 0.8 part of itaconic acid were added, and then, the whole of the above-mentioned monomer mixture (100 parts) was continuously added thereto over 16 hours. At this time, 0.1 part of sodium hydrogensulfite was also continuously added together with the monomer mixture. After addition of the whole of the monomer mixture, the inner pressure immediately started to fall, and the reaction was allowed to proceed until a fall in the inner pressure disappeared, thereby obtaining an aqueous dispersion of a vinylidene chloride polymer. To 100 g of a 3% aqueous solution of calcium chloride heated at 60° C., 30 g of this aqueous dispersion of the vinylidene chloride polymer was added dropwise little by little with stirring. Then, the formed aggregates were washed with water and dried to obtain a white powder. Ten grams of the vinylidene chloride polymer powder thus obtained was added to a mixed solvent of 30 g of tetrahydrofuran, 18 g of methyl ethyl ketone and 12 g of toluene, and then, the temperature was elevated to 65° C. to dissolve the polymer completely. This solution was cooled to 35° C., and allowed to stand for one hour or for 4 hours. Thereafter, a vinylidene chloride copolymer film and a laminated film were prepared in the same manner as in Example 1. This solution had a gelation temperature of 25° C. Results of measurement of thermally stimulated current for this laminated film is shown in FIG. 4.

EXAMPLE 7

The vinylidene chloride copolymer solution as prepared in Example 6 was allowed to stand at 45° C. for one hour or for 4 hours. Then, a vinylidene chloride copolymer film and a laminated film were prepared in the same manner as in Example 1.

EXAMPLE 8

The vinylidene chloride copolymer solution as prepared in Example 6 was allowed to stand at 10° C. for 3 hours. As a result, the solution gelled. Then, the gel was heated at 50° C. for 30 minutes to a solution state. Thereafter, a vinylidene chloride copolymer film and a laminated film were prepared in the same manner as in Example 1.

EXAMPLE 9

The vinylidene chloride copolymer solution as prepared in Example 6 was dissolved at 65° C, and then, toluene was added thereto so as to give a total solvent composition of THF/MEK/TOL of 5/3/4. Then, the resulting solution was allowed to stand at 45° C. for one hour or for 4 hours. Thereafter, a vinylidene chloride copolymer film and a laminated film were prepared in the same manner as in Example 1. The gelation temperature of this solution was 25° C.

Comparative Example 5

The vinylidene chloride copolymer solution as prepared in Example 6 was allowed to stand at 65° C. for one hour or for 4 hours. Then, a vinylidene chloride copolymer film and a laminated film were prepared in the same manner as in Example Comparative Example 6

Figure 5:
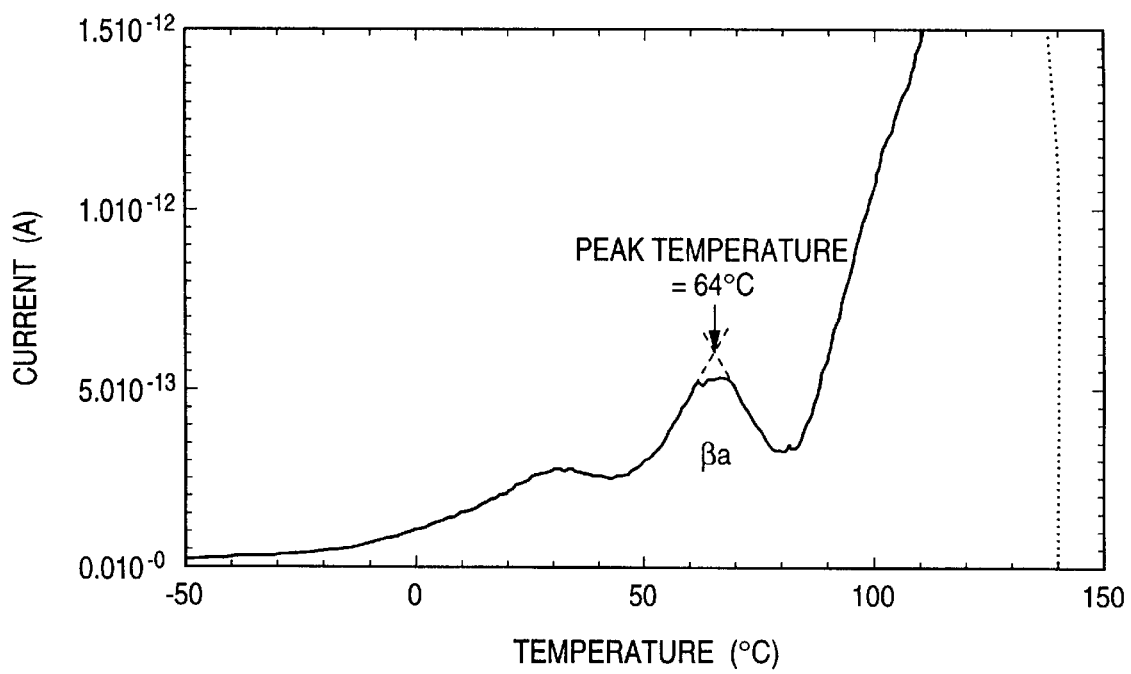
FIG. 5 is a graph showing results of measurement of thermally stimulated current for a laminated film of Comparative Example 6 in this invention.

The vinylidene chloride copolymer solution as prepared in Example 6 was allowed to stand at 45° C. for 30 minutes. Then, a vinylidene chloride copolymer film and a laminated film were prepared in the same manner as in Example 1. The results of measurement of thermally stimulated current for this laminated film are shown in FIG. 5.

Comparative Example 7

The vinylidene chloride copolymer solution as prepared in Example 6 was dissolved at 65° C., and then, toluene was added thereto so as to give a total solvent composition of THF/MEK/TOL of 5/3/4. Immediately after that, a vinylidene chloride copolymer film and a laminated film were prepared in the same manner as in Example 1.

Comparative Example 8

A vinylidene chloride copolymer film and a laminated film were prepared in the same manner as in Comparative Example 1, except that the heat treatment conditions were changed to at 70° C. for one day.

Comparative Example 9

A vinylidene chloride copolymer film and a laminated film were prepared in the same manner as in Comparative Example 2, except that the heat treatment conditions were changed to at 70° C. for one day.

The results of evaluation for the properties of the vinylidene chloride copolymer films and laminated films thus obtained are shown in Tables 1 to 3.

As apparent from Tables 1 to 3, the coating films obtained in Examples 1 to 9 are high in the degree of polymer orientation and extremely excellent in barrier properties, as compared to those obtained in Comparative Examples 1 to 7.

TABLE 1

| | Polymer Composition | Solvent Composition | Gelation Temperature (° C.) | Conditions of Dissolution | Conditions of Standing after Dissolution | Light Transmittance of Coating Material upon Coating | Conditions of Heat Treatment |
|---|---|---|---|---|---|---|---|
| Example 1 | VDC/AN/IA 88.8 10.4 0.8 | MEK/TOL 2 1 | 30 | 70° C., 1 hr | 40° C., 1 hr 4 hr | 76% 65% | 40° C., 24 hr |
| Example 2 | VDC/AN/IA 88.8 10.4 0.8 | MEK/TOL 2 1 | 30 | 70° C., 1 hr | 50° C., 1 hr 4 hr | 80% 70% | 40° C., 24 hr |
| Example 3 | VDC/AN/IA 88.8 10.4 0.8 | MEK/TOL 2 1 | 30 | 70° C., 1 hr | 20° C., 3 hr → 50° C., 30 min | 60% | 40° C., 24 hr |
| Comparative Example 1 | VDC/AN/IA 88.8 10.4 0.8 | MEK/TOL 2 1 | 30 | 70° C., 1 hr | 70° C., 1 hr 4 hr | 96% 95% | 40° C., 24 hr |

TABLE 1-continued

|  | Polymer Composition | Solvent Composition | Gelation Temperature (° C.) | Conditions of Dissolution | Conditions of Standing after Dissolution | Light Transmittance of Coating Material upon Coating | Conditions of Heat Treatment |
|---|---|---|---|---|---|---|---|
| Comparative Example 2 | VDC/AN/IA 88.8 10.4 0.8 | MEK/TOL 2 1 | 30 | 70° C., 1 hr | 50° C., 30 min | 93% | 40° C., 24 hr |
| Example 4 | VDC/AN/IA 88.8 10.4 0.8 | THF/MEK/TOL 1 3 1 | 20 | 50° C., 1 hr | 30° C., 1 hr 4 hr | 80% 75% | 40° C., 24 hr |
| Example 5 | VDC/AN/IA 88.8 10.4 0.8 | THF/MEK/TOL 1 3 1 | 20 | 50° C., 1 hr | 10° C., 3 hr → 45° C., 30 min | 67% | 40° C., 24 hr |
| Comparative Example 3 | VDC/AN/IA 88.8 10.4 0.8 | THF/MEK/TOL 1 3 1 | 20 | 50° C., 1 hr | 50° C., 1 hr 4 hr | 99% 98% | 40° C., 24 hr |
| Comparative Example 4 | VDC/AN/IA 88.8 10.4 0.8 | THF/MEK/TOL 1 3 1 | 20 | 50° C., 1 hr | 30° C., 30 min | 95% | 40° C., 24 hr |
| Example 6 | VDC/MAN/MMA/IA 88.8 5.5 4.9 0.8 | THF/MEK/TOL 5 3 2 | 25 | 65° C., 1 hr | 35° C., 1 hr 4 hr | 87% 76% | 40° C., 24 hr |
| Example 7 | VDC/MAN/MMA/IA 88.8 5.5 4.9 0.8 | THF/MEK/TOL 5 3 2 | 25 | 65° C., 1 hr | 45° C., 1 hr 4 hr | 90% 82% | 40° C., 24 hr |
| Example 8 | VDC/MAN/MMA/IA 88.8 5.5 4.9 0.8 | THF/MEK/TOL 5 3 2 | 25 | 65° C., 1 hr | 10° C., 3 hr → 50° C., 30 min | 65% | 40° C., 24 hr |
| Example 9 | VDC/MAN/MMA/IA 88.8 5.5 4.9 0.8 | After addition of TOL THF/MEK/TOL 5 3 4 | 25 | 65° C., 1 hr | After Addition of TOL 45° C., 1 hr 45° C., 4 hr | 74% 64% | 40° C., 24 hr |
| Comparative Example 5 | VDC/MAN/MMA/IA 88.8 5.5 4.9 0.8 | THF/MEK/TOL 5 3 2 | 25 | 65° C., 1 hr | 65° C., 1 hr 4 hr | 98% 97% | 40° C., 24 hr |
| Comparative Example 6 | VDC/MAN/MMA/IA 88.8 5.5 4.9 0.8 | THF/MEK/TOL 5 3 2 | 25 | 65° C., 1 hr | 45° C., 30 min | 95% | 40° C., 24 hr |
| Comparative Example 7 | VDC/MAN/MMA/IA 88.8 5.5 4.9 0.8 | After Addition of TOL THF/MEK/TOL 5 3 4 | 25 | 65° C., 1 hr | Immediately after addition of TOL | 97% | 40° C., 24 hr |
| Comparative Example 8 | VDC/AN/IA 88.8 10.4 0.8 | MEK/TOL 2 1 | 30 | 70° C., 1 hr | 70° C., 1 hr 4 hr | 96% 95% | 70° C., 24 hr |
| Comparative Example 9 | VDC/AN/IA 88.8 10.4 0.8 | MEK/TOL 2 1 | 30 | 70° C., 1 hr | 50° C., 30 min | 93% | 70° C., 24 hr |

TABLE 2

|  |  | Coating Film | | Laminated Film | | |
|---|---|---|---|---|---|---|
|  | Condition of Standing after Dissolution | X-Ray Peak (Q/P) | Density | X-Ray Intensity (I/J) | Half Band Width (°) | Oxygen Permeability (cc/m² · atm · 24 hr) |
| Example 1 | 40° C., 1 hr | 1.9 | 1.705 | 1.5 | 2.5 | 3.0 |
|  | 4 hr | 2.4 | 1.704 | 1.6 | 2.0 | 2.5 |
| Example 2 | 50° C., 1 hr | 1.7 | 1.704 | 1.4 | 2.0 | 3.2 |
|  | 4 hr | 2.2 | 1.702 | 1.5 | 2.2 | 2.8 |
| Example 3 | 20° C., 3 hr → 50° C., 30 min | 4.4 | 1.703 | 1.8 | 2.0 | 2.3 |
| Comparative Example 1 | 70° C., 1 hr | 0.7 | 1.702 | 1.1 | 2.5 | 4.8 |
|  | 4 hr | 0.8 | 1.704 | 1.1 | 2.5 | 4.6 |
| Comparative Example 2 | 50° C., 30 min | 1.2 | 1.706 | 1.2 | 2.5 | 4.0 |
| Example 4 | 30° C., 1 hr | 1.5 | 1.702 | 1.5 | 2.3 | 3.2 |
|  | 4 hr | 1.7 | 1.703 | 1.6 | 2.0 | 3.0 |
| Example 5 | 10° C., 3 hr → 45° C., 30 min | 2.6 | 1.705 | 1.8 | 2.0 | 2.6 |
| Comparative Example 3 | 50° C., 1 hr | 0.5 | 1.704 | 1.0 | 2.7 | 5.9 |
|  | 4 hr | 0.6 | 1.705 | 1.1 | 2.5 | 5.8 |
| Comparative Example 4 | 30° C., 30 min | 1.1 | 1.702 | 1.2 | 2.5 | 4.6 |
| Example 6 | 35° C., 1 hr | 2.1 | 1.728 | 1.5 | 2.0 | 2.1 |
|  | 4 hr | 2.5 | 1.730 | 1.7 | 2.0 | 1.7 |
| Example 7 | 45° C., 1 hr | 1.7 | 1.732 | 1.5 | 2.5 | 2.4 |
|  | 4 hr | 1.9 | 1.728 | 1.6 | 2.0 | 2.0 |
| Example 8 | 10° C., 3 hr → 50° C., 30 min | 4.8 | 1.727 | 1.9 | 2.0 | 1.5 |

TABLE 2-continued

|  |  | Coating Film | | Laminated Film | | |
|---|---|---|---|---|---|---|
|  | Condition of Standing after Dissolution | X-Ray Peak (Q/P) | Density | X-Ray Intensity (I/J) | Half Band Width (°) | Oxygen Permeability (cc/m² · atm · 24 hr) |
| Example 9 | After addition of TOL | | | | | |
|  | 45° C., 1 hr | 2.1 | 1.730 | 1.6 | 2.0 | 1.6 |
|  | 45° C., 4 hr | 4.5 | 1.727 | 2.1 | 2.0 | 1.4 |
| Comparative Example 5 | 65° C., 1 hr | 1.1 | 1.725 | 1.2 | 2.2 | 3.0 |
|  | 4 hr | 1.2 | 1.730 | 1.1 | 2.3 | 3.1 |
| Comparative Example 6 | 45° C., 30 min | 1.3 | 1.728 | 1.3 | 2.3 | 2.7 |
| Comparative Example 7 | Immediately After Addition of TOL | 1.1 | 1.726 | 1.2 | 2.2 | 2.9 |
| Comparative Example 8 | 70° C., 1 hr | 0.8 | 1.740 | 1.1 | 2.5 | 4.2 |
|  | 4 hr | 0.8 | 1.741 | 1.1 | 2.5 | 4.0 |
| Comparative Example 9 | 50° C., 30 min | 1.2 | 1.739 | 1.2 | 2.5 | 3.2 |

TABLE 3

|  |  | Laminated Film | | | |
|---|---|---|---|---|---|
|  | Conditions of Standing After Dissolution | βa Peak Temperature (° C.) | X-Ray Intensity (I/J) | Half Band Width (°) | Oxygen Permeability (cc/m² · atm · 24 hr) |
| Example 6 | 35° C., 1 hr | 82 | 1.5 | 2.0 | 2.1 |
|  | 4 hr | 84 | 1.7 | 2.0 | 1.7 |
| Example 7 | 45° C., 1 hr | 77 | 1.5 | 2.5 | 2.4 |
|  | 4 hr | 82 | 1.6 | 2.0 | 2.0 |
| Example 8 | 10° C., 3 hr → 50° C., 30 min | 85 | 1.9 | 2.0 | 1.5 |
| Example 9 | After addition of TOL | | | | |
|  | 45° C., 1 hr | 85 | 1.6 | 2.0 | 1.6 |
|  | 45° C., 4 hr | 86 | 2.1 | 2.0 | 1.4 |
| Comparative Example 5 | 65° C., 1 hr | 60 | 1.2 | 2.2 | 3.0 |
|  | 4 hr | 60 | 1.1 | 2.3 | 3.1 |
| Comparative Example 6 | 45° C., 30 min | 64 | 1.3 | 2.3 | 2.7 |
| Comparative Example 7 | Immediately after Addition of TOL | 60 | 1.2 | 2.2 | 2.9 |

The abbreviations used in Tables are as follows:

VDC: Vinylidene chloride
AN: Acrylonitrile
IA: Itaconic acid
MAN: Methacrylonitrile
MMA: Methyl methacrylate
MEK: Methyl ethyl ketone
TOL: Toluene
THF: Tetrahydrofuran

INDUSTRIAL APPLICABILITY

The vinylidene chloride copolymer films or laminated films of the present invention have considerably excellent barrier properties, compared with the conventional ones, so that the same barrier properties can be attained with a smaller coating amount and a reduction in coating cost and an improvement in quality can be achieved.

What is claimed is:

1. A method for producing a vinylidene chloride copolymer film or laminated film having excellent barrier properties, which comprises:

applying a coating material produced by:
putting, into an organic solvent, powder of a vinylidene chloride copolymer obtained by emulsion copolymerization of 88% to 93% by weight of vinylidene chloride and 12% to 7% by weight of at least one monomer copolymerizable with vinylidene chloride, so that the vinylidene chloride copolymer powder is dissolved in the organic solvent; and then allowing the resulting solution to stand at a temperature of a gelation temperature +20° C. or less for one hour or more; and subjecting the applied coating material to heat treatment at from 30° C. to 80° C.

2. The method according to claim 1, wherein the monomer copolymerizable with vinylidene chloride contains 50% or more of methacrylonitrile.

3. A method for producing a vinylidene chloride copolymer film or laminated film having excellent barrier properties, which comprises:

applying a coating material produced by:
putting, into an organic solvent, powder of a vinylidene chloride copolymer obtained by emulsion copolymerization of 88% to 93% by weight of vinylidene chloride and 12% to 7% by weight of at least one monomer copolymerizable with vinylidene chloride, so that the vinylidene chloride copolymer powder is dissolved in the organic solvent;
adding a poor solvent thereto; and then
allowing the resulting solution to stand at a temperature of a gelation temperature +20° C. or less for one hour or more; and subjecting the applied coating material to heat treatment at from 3.0° C. to 80° C.

4. The method according to claim 3, wherein the monomer copolymerizable with vinylidene chloride contains 50% or more of methacrylonitrile.

5. The method according to claim 3, wherein the ratio of the poor solvent to the total of all solvents is from 20% to 50%.

6. The method according to claim 3, wherein the poor solvent is toluene.

7. A vinylidene chloride copolymer film having excellent barrier properties, which comprises 88% to 93% by weight of vinylidene chloride and 12% to 7% by weight of at least one monomer copolymerizable with vinylidene chloride and which has a ratio (Q/P) of 1.5 or more, wherein Q is the integrated intensity of the peak at $2\theta=38°$ and P is the integrated intensity of the peak at $2\theta=15°$, each as determined by the wide angle X-ray reflection method.

8. The vinylidene chloride copolymer film having excellent barrier properties according to claim 7, wherein the $\beta a$ peak temperature as determined by the thermally stimulated current method (TSC) is 70° C. or more.

9. The vinylidene chloride copolymer film having excellent barrier properties according to claim 8,
comprising 88% to 93% by weight of vinylidene chloride and 12% to 7% by weight of at least one monomer copolymerizable with vinylidene chloride, which contains 50% or more of methacrylonitrile.

10. A laminated film having excellent barrier properties, comprising a base film and a vinylidene chloride copolymer layer which comprises 88% to 93% by weight of vinylidene chloride and 12% to 7% by weight of at least one monomer copolymerizable with vinylidene chloride and which has a ratio (I/J) of 1.4 or above, wherein I and J are the peak intensity and base line intensity at $2\theta=38°$, respectively, and a half band width of the peak at $2\theta=38°$ of 3° or below, each as determined by the wide angle X-ray reflection method while the incident X-ray is introduced from the vinylidene chloride copolymer layer side.

11. The laminated film having excellent barrier properties according to claim 10, wherein the $\beta a$ peak temperature as determined by the thermally stimulated current method (TSC) is 70° C. or more.

12. The laminated film having excellent barrier properties according to claim 11, which comprises:
a base film of polypropylene; and
a vinylidene chloride copolymer layer,
comprising 88% to 93% by weight of vinylidene chloride and 12% to 7% by weight of at least one monomer copolymerizable with vinylidene chloride, which contains 50% or more of methacrylonitrile.

13. The laminated film according to claim 10, wherein the base film comprises at least one polymer selected from the group consisting of polyesters, polyamides, polyimides, polypropylene, polyethylene, polyvinyl alcohol, cellophane, polystyrene, polyvinyl chloride, ethylene-vinyl alcohol copolymers and polycarbonates.

* * * * *